US00RE36031E

United States Patent [19]

Piaget et al.

[11] E Patent Number: Re. 36,031

[45] Reissued Date of Patent: Jan. 5, 1999

[54] STRIDING-TYPE EXERCISE APPARATUS

[76] Inventors: Gary D. Piaget, 3390 American Saddler Dr.; Trace O. Gordon, 3880 W. Lariat Rd., both of Park City, Utah 84060

[21] Appl. No.: 529,514

[22] Filed: Sep. 18, 1995

Related U.S. Patent Documents

Reissue of:

[64] Patent No.: 5,419,747
Issued: May 30, 1995
Appl. No.: 188,156
Filed: Jan. 27, 1994

[51] Int. Cl.[6] ..... A63B 22/00

[52] U.S. Cl. ..... 482/51; 482/70; 434/255

[58] Field of Search ..... 482/51, 54, 70, 482/111, 112, 125, 62, 139, 73, 52, 53; 434/255, 247; 601/33, 35

[56] References Cited

U.S. PATENT DOCUMENTS

| | | | |
|---|---|---|---|
| 4,645,200 | 2/1987 | Hix . | |
| 4,850,585 | 7/1989 | Dalebout | 482/51 |
| 4,934,690 | 6/1990 | Bull | 482/53 |
| 4,940,233 | 7/1990 | Bull et al. | 482/51 |
| 4,989,858 | 2/1991 | Young et al. | 482/53 |
| 5,000,443 | 3/1991 | Dalebout et al. | 482/51 |
| 5,039,088 | 8/1991 | Shifferaw | 482/57 |
| 5,039,091 | 8/1991 | Johnson | 482/139 |
| 5,078,390 | 1/1992 | Hurt | 482/53 |
| 5,104,363 | 4/1992 | Shi | 482/73 |
| 5,139,255 | 8/1992 | Sollami | 482/62 |
| 5,290,211 | 3/1994 | Stearns | 482/53 |

*Primary Examiner*—Stephen R. Crow
*Attorney, Agent, or Firm*—Salter & Michaelson

[57] ABSTRACT

Exercise apparatus is provided for exercising all four limbs of the body. The exercise apparatus effectively simulates the anatomical movements of the body during walking and provides positive and negative resistance to all four limbs of the body during use. The exercise apparatus includes a frame having upright support members, two leg member and two arm members which are pivotably mounted to the support members at vertically spaced positions so that the leg members are generally pivotable at the hips of the user and the arm members are generally pivotable at the shoulders of the user. Hydraulic cylinders are connected between the arm and leg members to provide resistance when the arm and leg members are reciprocated in opposite directions during use of the apparatus. The distances between the hip and shoulder pivots, the hip pivot and foot platforms and the shoulder pivot and handgrips are adjustable to accommodate the anatomical differences of different size users.

19 Claims, 4 Drawing Sheets

STRIDING-TYPE EXERCISE APPARATUS

Matter enclosed in heavy brackets [ ] appears in the original patent but forms no part of this reissue specification; matter printed in italics indicates the additions made by reissue.

BACKGROUND OF THE INVENTION

The instant invention relates to exercise apparatus and more particularly to exercise apparatus which is effective for simultaneously exercising all four limbs of the body and aerobically conditioning the cardiovascular system of the body.

Walking, jogging, bicycling and rowing have been found to be effective activities for exercising the body, and in particular, the legs, heart and lungs. However, the harried, fast pace lifestyles of many people limit the amount of time available for such exercise activities. In addition, these activities are primarily outdoor activities which can be limited during the colder winter months, and during inclement weather in the summer months. The limitations of traditionally outdoor exercise activities have in some respects been resolved by the development of indoor exercise apparatus which simulate these exercise activities. In this regard, a wide variety of bicycling, rowing, jogging and stair climbing apparatus have heretofore been known in the art. For example, the U.S. Pat. Nos. to Hix 4,645,200; Young et al 4,989,858; Shi 5,104,363; Dalebout 4,850,585; and Bull et al 4,940,233 generally illustrate these types of apparatus. The patent to Dalebout U.S. Pat. No. 4,850,585 is thought to be of particular interest in that it discloses a striding apparatus. The Dalebout apparatus includes a frame and a pair of reciprocating leg members which support a user above a supporting surface, such as a floor. A user stands on foot supports connected to the leg members and moves his/her legs in a striding-type reciprocating motion. A pair of handle members may also be associated with the leg members to rotate simultaneously therewith. A reciprocation mechanism may be provided to force opposite rotation of the leg and arm members with respect to each other.

Walking is considered to be one of the most effective aerobic exercises because it provides a low impact aerobic exercise which tones the muscles of the lower body and aerobically condition the cardiovascular system. However, despite the multitude of available exercise apparatus, there are not exercise machines which simulate the natural striding movements of both the arms and legs during walking.

SUMMARY OF THE INVENTION

The instant invention provides a striding-type exercise apparatus which effectively simulates the striding movements of the body during walking and exercises all four limbs of the body while simultaneously aerobically conditioning the cardiovascular system of the body.

Briefly, the apparatus comprises first and second spaced support members, two leg members which are pivotably mounted to the support members, and two arm members which are pivotably mounted to the support members above the leg members. The leg and arm members are vertically spaced so that the leg members are generally pivotable at the hips of the user, and the arm members are generally pivotable at the shoulders of the user. Each of the leg members include a platform for supporting a user in an upright position between the leg members, and each of the arm members include a hand grip. Dual-action hydraulic cylinders are connected to the leg members and the arm members to provide resistance when the respective arm and leg members are reciprocated in opposite directions.

For use of the apparatus, the user adjusts the positions of the platform members, and the height of the arm members so that the leg members are generally pivotable at the hips of the user, and the arm members are generally pivotable at the shoulders of the user. Thereafter, while standing on the platform members and grasping the handgrips, the user reciprocates the respective arm and leg members in opposite directions thereby simulating the natural striding movements of the body during walking. The hydraulic cylinders are compressed and extended when the leg and arm members are reciprocated in opposite direction thereby providing equal and opposite resistance for both the arm and leg of the user.

Accordingly, it is an object of the instant invention to provide a striding-type exercise apparatus which simulates the natural striding movements of the body during walking.

It is another object to provide a striding-type exercise apparatus which is effective for exercising all four limbs of the body.

It is yet another object to provide a striding-type exercise apparatus which aerobically exercises the cardiovascular system of the body.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DESCRIPTION OF THE PREFERRED EMBODIMENT

Figure 1:
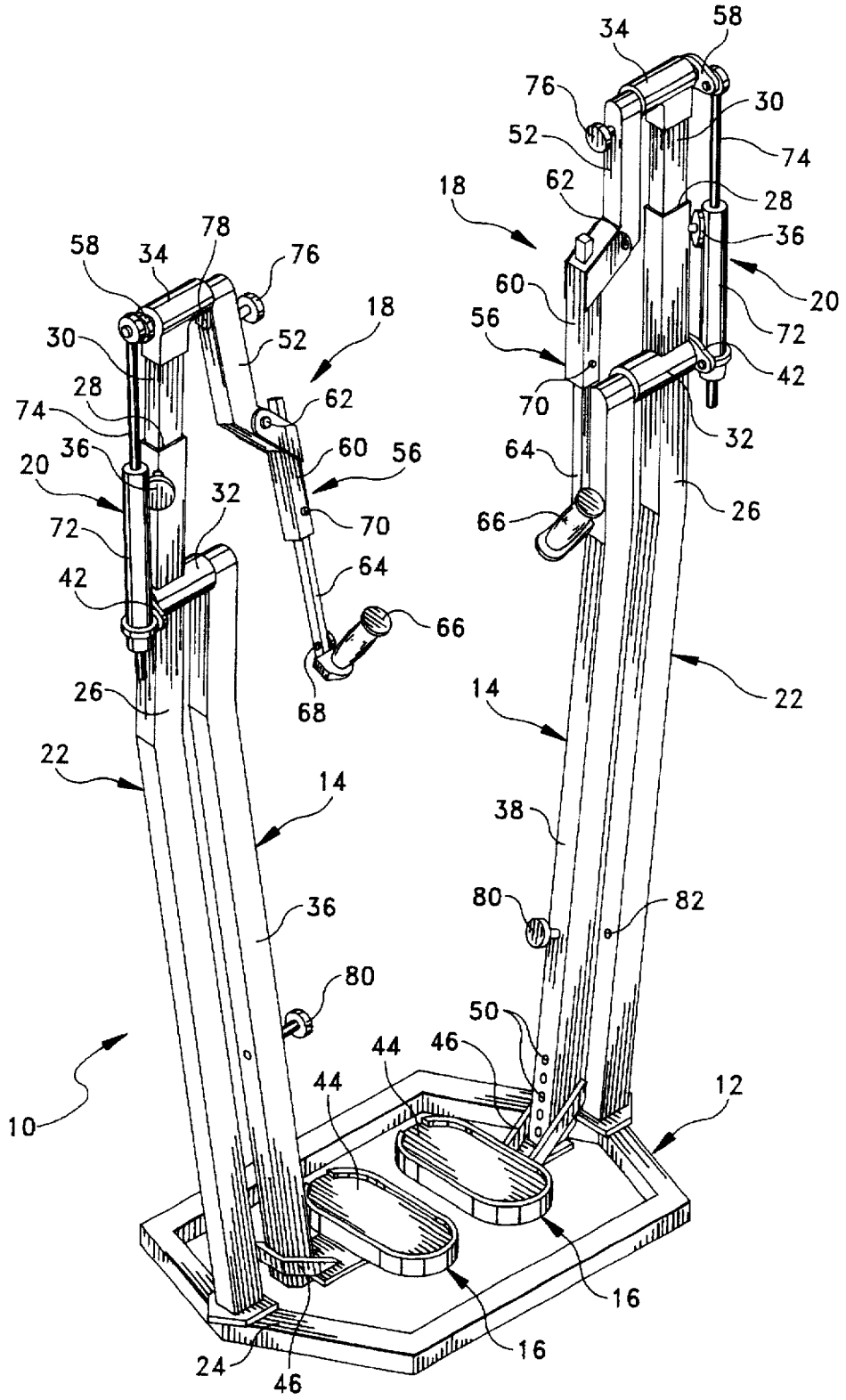
FIG. 1 is perspective view of the striding-type exercise apparatus of the instant invention.

Referring now to the drawings, the striding-type exercise apparatus of the instant invention is illustrated and generally indicated at 10 in FIG. 1. As will hereinafter be more fully disclosed, the exercise apparatus 10 simulates the natural striding movements of the body during walking, and is operative for exercising all four limbs of a user'body while simultaneously aerobically conditioning the cardiovascular system of the body. The exercise apparatus comprises a frame generally indicated at 12, first and second leg members generally indicated at 14, first and second platform members generally indicated at 16, first and second arm members generally indicated at 18, and first and second hydraulic cylinders generally indicated at 20.

The frame 12, leg members 14 and arm members 18 are preferably constructed from a durable metal, or the like, in order to withstand the repeated physical stresses of day to day use. The frame 12 comprises first and second substantially vertical, spaced support members generally indicated at 22 and a base portion 24 which is adapted to support the support members 22 on a supporting surface, such as a floor. Each of the first and second support members 22 comprises an upright body portion 26 having a tubular end 28, and a neck portion 30 which is slidably received in the tubular end 28. Each of the support members further includes a first pivot bearing 32 which is located in the upright body portion 26 and a second pivot bearing 34 which is located at the terminal end of the neck portion 30. Each of the first and second pivot bearings 32 and 34 defines an axis of rotation for a respective leg member 14 or arm member 18 which is pivotably mounted therein. It is pointed out that the neck portion 30 is slidably adjustable within the tubular end 28 of the body portion 26 so that the axis of rotation of the second bearing 34 is slidably movable relative to the axis of rotation of the first bearing 32. Each of the support members 22 is further provided with a set screw 36 setting the vertical position of the neck portion 30 with respect to the body portion 26. The set screw 36 is threaded through the body portion 26 where it engages with the neck portion 30 received therein. An enlarged knob or handle portion of the set screw 36 facilitates manual rotation thereof.

The first and second leg members 14 each comprise a body portion 38 having a pivot shaft 40 (FIG. 2) at one end thereof. A bell crank 42 is mounted on the terminal end of the pivot shaft 40. The pivot shafts 40 of the leg members 14 are received through the pivot bearings 32 wherein each leg member 14 is operative for reciprocating movement between the support members 22. Each pivot shaft 40 extends through the respective pivot bearing 32 so that the bell crank 42 can be mounted on the terminal end of the respective pivot shaft 40.

The first and second platform members 16 are operative for supporting a user in an upright position between the leg members 14 during use of the apparatus 10 and each comprises a planar body portion 44, a tubular mounting portion 46, and a mounting pin 48 extending inwardly from an inner surface of the tubular mounting portion 46. Each of the leg members 14 includes a plurality of adjustment holes 50 which are adapted for receiving the mounting pins 48 in engagement therewith. In this regard, the tubular mounting portions 46 of the platform members 16 are slidably received over the end of their respective leg member 14 so that the mounting pin 48 thereof aligns and engages with one of the adjustment holes 50 in the leg member. It can be seen that the planar body portions 44 of the platform members 16 are operative for receiving the feet of a user during use of the apparatus 10 wherein the user is supported in an upright position between the leg members 14, and it can further be seen that the platform members 16 are slidably adjustable up and down the length of the respective leg members 14 so that the distance between the planar body portion 44 and the axis of rotation (pivot shaft 40) of the leg members 14 is adjustable.

The first and second arm members 18 each comprise an upper arm portion 52, having a pivot shaft 54 (FIG. 2) thereon, and a lower arm portion generally indicated at 56. A bell crank 58 is mounted on the pivot shaft 54. The pivot shafts 54 are received through their respective pivot bearings 34 wherein each arm member 18 is operative for reciprocating movement between the support members 22. The pivot shafts 54 extend through the pivot bearings 34 so that the respective bell cranks 58 can be mounted on the terminal ends of the pivot shafts 54.

Figure 3:
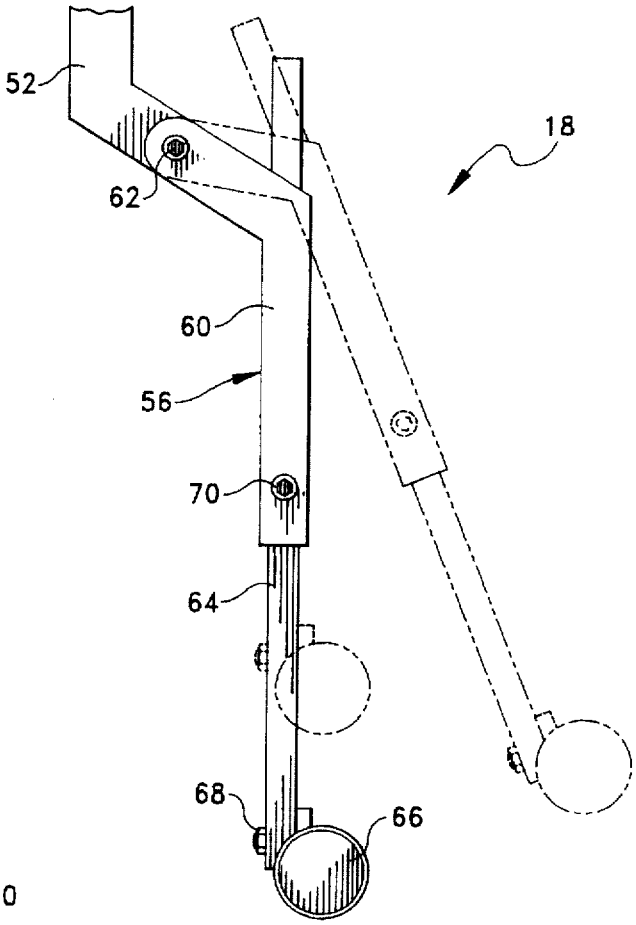
FIG. 3 is a front elevational view of one of the arm members of the apparatus.
Figure 4:
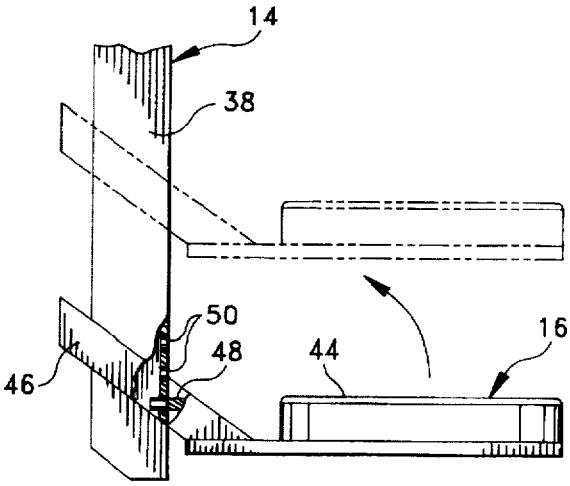
FIG. 4 is a side elevational view, partially in section, of one of the platform members of the apparatus.

Referring to FIG. 3, each of the lower arm portions 56 comprises a tubular body portion 60 which is pivotably connected to the upper arm portion 52 by a pivot pin 62. The lower arm portion further includes a slide bar 64 which is slidably received in the tubular body portion 60, and a handgrip 66 which is rotatably mounted to the end of the slide bar 64 by a pivot pin 68. The lower arm portion 56 pivots about the pivot pin 62 for angular movement (see broken lines) of the handgrip 66 towards and away from the user. In this manner, the distance between the handgrip 66 and the user'body may be adjusted to the desired position. The slide bar 64 is slidably adjustable relative to the tubular body portion 60 so that the distance between the handgrips 66 and the axis of rotation (pivot shaft 54) of the arm member 18 is adjustable. In this regard, the lower arm portion 56 is provided with a set screw 70 which is threaded through the body portion 60 so that it engages the slide bar 64. The pivoting connection of the handgrips 66 to the slide bars 64 enables the handgrips 66 to rotate with respect to the lower arm portion 56 and thereby reduces stress on the wrist joints of the user as the arm member 18 is pivoted through its range of motion.

It is pointed out that the platform members 16 can also be rotatably connected to the leg members 14 to reduce stress on the ankle joints of the user as the leg members 14 pivot through their arcuate range of motion during use.

Figure 2:
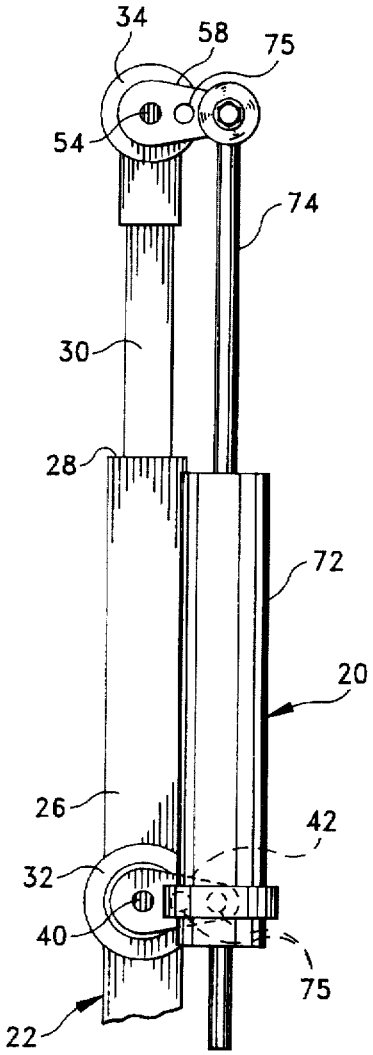
FIG. 2 is a side elevational view of one of the hydraulic resistance cylinders of the apparatus.

Referring to FIG. 2, the first and second hydraulic cylinders 20 preferably comprise dual-action hydraulic cylinders which provide equal and opposite resistance when being compressed and extended. Each hydraulic cylinder 20 includes a cylindrical body portion 72 and a rod portion 74 which is slidable within the body portion 72. The body portions 72 of the hydraulic cylinders 20 are pivotably connected to the respective bell cranks 42 on the leg members 14 and the rod portions 74 thereof are pivotably connected to the respective bell cranks 58 on the arm members 18. It is pointed out that the bell cranks 42 and 58 are mounted so that the free ends thereof are oriented in a forwardly facing direction when the arm members 18 and leg members 14 are in the resting neutral position as illustrated in FIG. 1. It is pointed out that each hydraulic cylinder 20 is compressed when the respective leg member 14 is pivoted in the forward direction and the respective arm member 18 is pivoted in the rearward direction. On the other hand, each of the hydraulic cylinders 20 is extended when the respective leg member 14 is pivoted in the rearward direction and the respective arm member 18 is pivoted in the forward direction. Since the hydraulic cylinders 20 are a dual action cylinders, they provide equal resistance through both ranges of motion when the leg members 14 and arm members 18 are pivoted in opposite directions. This is a significant advantage over the prior art walking or striding apparatus which do not provide positive and negative resistance to movement of the arms for exercise thereof.

Both sets of bell cranks 42 and 58 preferably include a plurality of mounting holes 75 for connecting the hydraulic cylinders 20 thereto. The plurality of mounting holes permit the resistance of the hydraulic cylinders 20 to be varied by mounting the cylinders 20 at increasing distances from the axis of rotation (pivot shaft) of the respective leg member 14 or arm member 18. As the hydraulic cylinder 20 is moved away from the axis of rotation of the arm member 18 or leg member 14 the resistance increases and as the hydraulic cylinder 20 is moved closer to the axis of rotation, the resistance is decreased.

Referring now to FIG. 1, the apparatus 10 is further provided with means for individually isolating or preventing reciprocal movement of each leg member 14 and each arm member 18. The locking means for each of the arm members 18 comprise a set screw 76 and a metal tab 78 having a threaded aperture (not shown) therein. To prevent reciprocal movement of the arm members 18, the respective set screw 76 is extended through the upper arm portion 52 and threaded into the aperture in the metal tab 78. An enlarged knob portion of the sets screw 76 facilitates rotation thereof. The locking means for each of the leg members 14 comprises a set screw 80 and a threaded aperture 82 in the support means 22 adjacent the set screw 78. To prevent movement of the leg members 14, the set screws 80 are threaded into their respective apertures 82. Individual isolation of each of the arm members 18 and leg members 14 provides and advantage in rehabilitative or therapeutic applications wherein exercise is to be limited to one or more specific limbs of the individual. For example, with patients who have recently received a hip replacement, exercise would be limited to the particular hip which was replaced. Preventing movement of the other three members provides stability to the apparatus 10 while the patient exercises the individual limb. It can also be appreciated that both of the arm members 18 could be locked when it is desired only to exercise the legs, and vice versa, when it is desired to exercise only the arms. It is further contemplated that a hydraulic interconnecting system could interconnect one leg member 14 to the other leg member 14 and one arm member 18 to the other arm member 18 wherein movement of one leg member 14 forward would cause movement of the other leg member 14 backward and likewise for the arm members 18. Such an interconnect system would operate to stabilize the device and facilitate entry and egress.

For use of the exercise apparatus 10, a user first adjusts the vertical position of the platform members 16 on the leg members 14 so that when standing on the platform members 16, the hips of the user are in general axial alignment with the axes of rotation (pivot shafts 40) of the leg members 14. It is pointed out that the user'hips should not be positioned above the pivot axes of the leg members 14 because this tends to throw the user off balance during use. The user must then adjust the positions of the neck portions 30 of the support members 22 so that when standing on the platform members 16, the user'shoulders are generally in axial alignment with the axes of rotation (pivot shafts 54) of the arm members 18. To effect this adjustment, the user must loosen the set screws 36 in the upright body portions 26 of the support members 22 and then slidably adjust the position of the neck portion 30. It is also pointed out that the user'shoulders should not be positioned above the pivot axes of the arm members. Next, the user must adjust the handgrips 66 so that the distance between the handgrips 66 and the axes of rotation (pivot shafts 54) of the arm members 18 are generally equivalent to the length of the user'arm. It can therefore be seen that the exercise apparatus 10 of the instant invention is fully adjustable to accommodate the anatomical differences of different size users.

To operate the exercise apparatus 10, the user stands on the platform members 16, grasps the handgrips 66 and then moves his/her arms and legs in a reciprocating motion similar to the motions used when walking or jogging. For instance, the user would first swing his/her right leg forward, right arm rearward, left leg rearward and left arm forward, and then swing the right leg rearward, right arm forward, left leg forward and left arm rearward. The dual-action hydraulic cylinders 20 are operative for providing equal resistance in both directions of movement. This reciprocating movement is repeated for several minutes wherein all four limbs of the user'body are stretched and toned.

Figure 5:
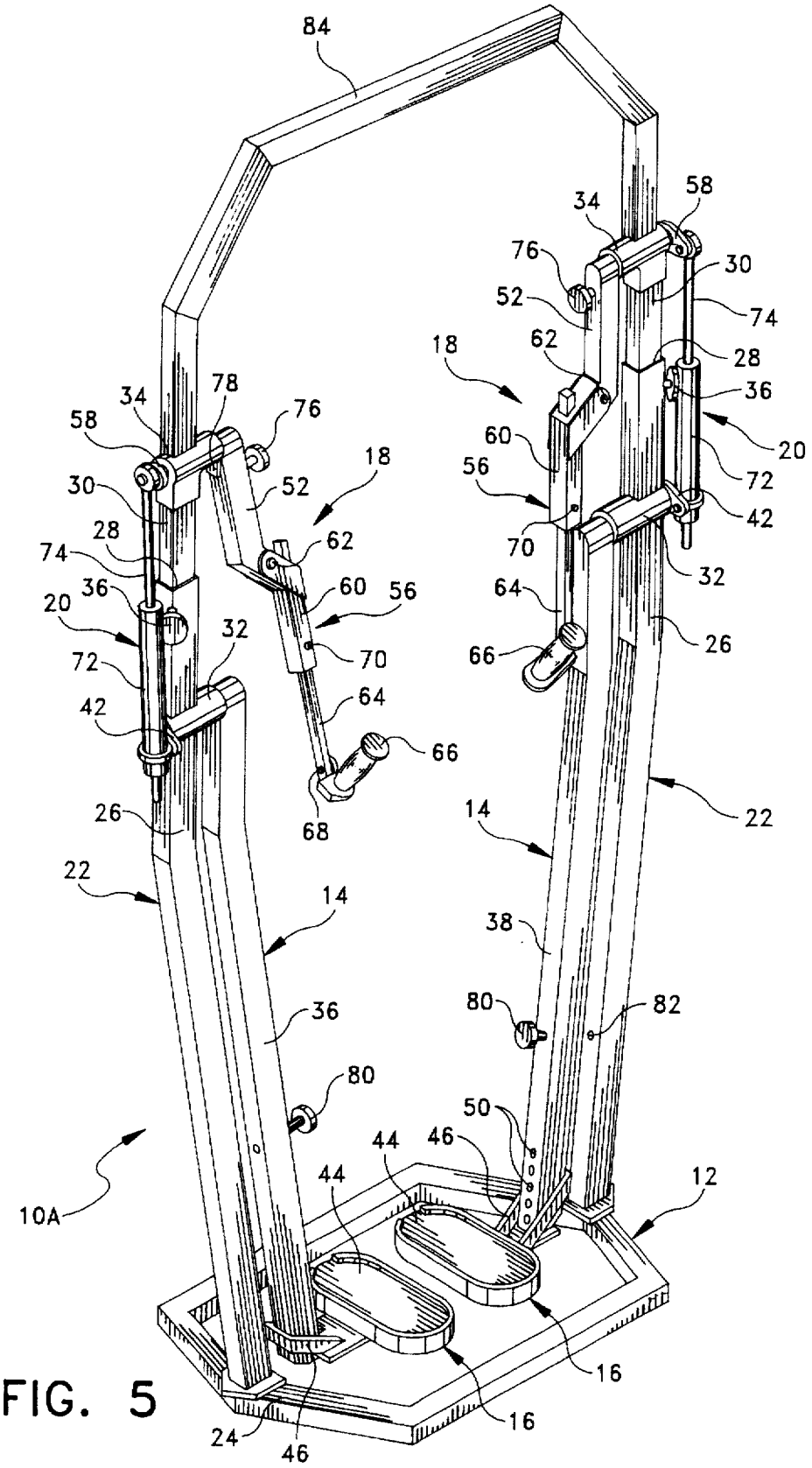
FIG. 5 is a perspective view of a second embodiment of the instant exercise apparatus.
Figure 6:
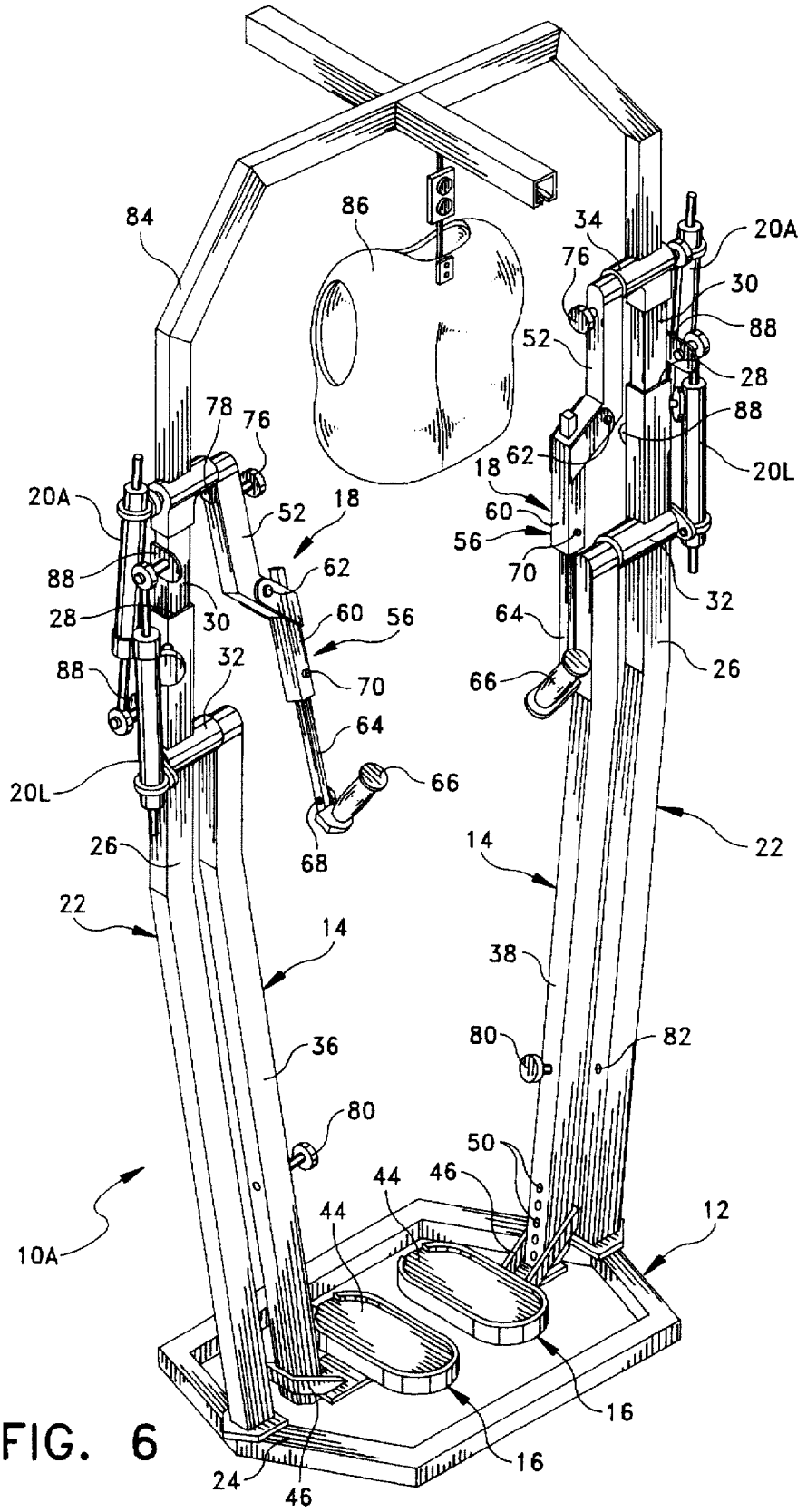
FIG. 6 is another perspective view of the second embodiment showing a harness and an alternate hydraulic cylinder arrangement.

A second embodiment of the instant exercise apparatus is illustrated and generally indicated at 10A in FIGS. 5 and 6. The exercise apparatus 10A is substantially identical to the first embodiment 10, except that the frame 12 is provided with an overhead stabilizing bar 84. The stabilizer bar 84 extends between the spaced support members 22 and counters inward bending moments of the support members 22 during use. By providing the overhead stabilizer bar 84, the support members 22 and base 24 can be fashioned from lighter, less durable materials, thereby reducing the manufacturing costs of the apparatus. In addition, the overhead bar 84 can be used to support a sling 86, (see FIG. 6) or other type of harness, for supporting a physical therapy patient during rehabilitation.

Still referring to FIG. 6, an alternate arrangement of the hydraulic cylinders 20 is illustrated. In this regard, each of the leg members 14 and arm members 18 is provided with an individual hydraulic cylinder 20L or 20A. The body portions 72 of the four hydraulic cylinders are mounted to the bell cranks 42 and 58 of the leg and arm members, and the rod portions 74 are attached to flanges 88 on the support members 22. More specifically, the flanges 88 for the leg hydraulic cylinders 20L are mounted on the neck portion 30 of the support members 22, and the flanges 88 for the arm hydraulic cylinders 20A are mounted on the body portions 26 of support members. The hydraulic cylinders 20L and 20A are adjustable by means of the apertured bell cranks 42 and 58, and spaced apertures (not shown) in the flanges 88. The provision of the individual hydraulic cylinders 20L and 20A allows the user to adjust the resistance of the arms and legs separately. In all other aspects, operation of the exercise device 10A is the same as previously described.

It is seen therefore that the instant invention provides an exercise apparatus 10 which effectively simulates the striding movements of the body during walking and exercises all four limbs of the body while simultaneously aerobically conditioning the cardiovascular system of the body. Because the axes of rotation of the leg members 14 and arm members 18 are generally aligned with those of the hip and shoulders of the body, the movement of the arm members 18 and leg members 14 is natural, smooth, balanced and efficient. The hydraulic cylinders 20 of the exercise apparatus 10 provide directionally equal resistance to stretch, tone and develop the various muscle groups of the arms and legs. The mounting arrangement of the arm members 18 and leg members 14 effectively eliminates skeletal trauma an inertial loads to the body, and it also provides for rapid movement and high repetitions. The rapid movement and high repetitions achieved with the exercise apparatus 10 enable the user to rapidly increase his/her heart rate for effective cardiovascular conditioning. For these reasons, the exercise apparatus 10 of the instant invention is believed to represent significant advancements in the art which have significant commercial merit.

While there is shown and described herein certain specific structure embodying the invention, it will be manifest to these skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Exercise apparatus comprising:

a frame including first and second spaced upright support members, *said first and second upright support members being spaced by a distance which permits a user to stand therebetween*;

first and second leg members respectively pivotably mounted on said first and second support members at a first pivot axis said first and second leg members *being suspended from said first pivot axis and* being operative for reciprocating *pendulum* movement [between] *through a plane passing through* said support members, said first and second leg members each including a platform for supporting a user in an upright position between said leg members;

first and second arm members respectively pivotably mounted on said first and second support members at a second pivot axis which is positioned above said first pivot axis, said arm members being positioned above said leg members, between said support members, said first and second arm members each including a handgrip and; and means for providing resistance when reciprocating said leg members and said arm members in opposite directions.

2. In the exercise apparatus of claim 1, said resistance means comprising means for providing positive and negative resistance when reciprocating said leg members and said arm members in opposite directions.

3. In the exercise apparatus of claim 1, said resistance means comprising a first hydraulic cylinder connected between said first leg member and said first arm member and a second hydraulic cylinder connected between said second leg member and said second arm member.

4. In the exercise apparatus of claim 1, each of said leg members and said arm members including a pivot shaft and bell crank thereon, said exercise apparatus further comprising a first hydraulic cylinder connected between said bell cranks on said first leg member and said first arm member, and a second hydraulic cylinder connected between said bell cranks on said second leg member and said second arm member.

5. In the exercise apparatus of claim 4, each of said bell cranks including a plurality of spaced mounting holes for mounting said first and second hydraulic cylinders thereto.

6. In the exercise apparatus of claim 1, said first and second support members each including means for adjusting the distance between the pivot axis of said leg members and the pivot axis of said arm member.

7. In the exercise apparatus of claim 1, said first and second support members comprising:

a body portion on which said leg member is pivotably mounted, said body portion having an upwardly opening tubular end;

a neck portion on which said arm member is pivotably mounted, said neck portion being slidably receivable in said tubular end portion of said body portion so that said pivot axis of said arm member is slidably moveable relative to said pivot axis of said leg member; and set screw means for selectively setting a position of said neck portion with respect to said body portion.

8. The exercise apparatus of claim 1 further comprising locking means for selectively preventing reciprocal movement of each of said leg members and said arm members.

9. In the exercise apparatus of claim 1, further including means for adjusting a distance between said platform members and the pivot axes of said leg members.

10. In the exercise apparatus of claim 1, said first and second leg members each including a plurality of adjustment holes therein, said first and second platform members each including a tubular mounting portion and an adjustment pin extending inwardly from said tubular mounting portion, said tubular mounting portion being slidably receivable on said respective leg member wherein said pin is receivable in one of said plurality of adjustment holes.

11. In the exercise apparatus of claim 1, including means for adjusting the distance between said handgrips and pivot axes of said arm members.

12. In the exercise apparatus of claim 1, said first and second arm members each comprising an upper arm portion respectively pivotably mounted on said first and second support members, and a lower arm portion including a handgrip, said lower arm portion being pivotally mounted to said first arm portion.

13. In the exercise apparatus of claim 12, said lower arm portions comprising a tubular body which is pivotably mounted to said upper arm portion and a shaft including said handgrip, said shaft being slidably receivable in said tubular body wherein said handgrip means is slideably movable relative to said pivot axis of said arm member, said lower arm member further including locking means for selectively setting a position of said shaft relative to said tubular body.

14. In the exercise apparatus of claim 1, said handgrips being pivotably connected to said respective first and second arm members.

15. In the exercise apparatus of claim 1, said frame further including an overhead stabilizing bar which extends between said first and second spaced support members.

16. In the exercise apparatus of claim 1, said resistance means comprising four hydraulic cylinders which are respectively connected between said first and second leg members and said first and second support members and between said first and second arm members and said first and second support members.

17. In the exercise apparatus of claim 15, said overhead stabilizing bar including sling means for supporting a patient from said overhead stabilizing bar.

*18. Exercise apparatus comprising:*

*a frame including first and second spaced upright support members, said first and second upright support members being spaced by a distance which permits a user to stand therebetween;*

*first and second leg members respectively pivotably mounted on said first and second support members at a first pivot axis, said first and second leg members being suspended from said first pivot axis and being operative for reciprocating pendulum movement through a plane passing through said support members, said first and second leg members each including a platform for supporting a user in an upright position between said leg members; and*

*first and second arm members respectively pivotably mounted on said first and second support members at a second pivot axis which is positioned above said first pivot axis, said arm members being positioned above said leg members, said arm members being operative for reciprocating movement between said support member, said first and second arm members each including a handgrip.*

*19. The exercise apparatus of claim 18 further comprising means for providing resistance when reciprocating said leg members and said arm members in opposite directions.*

* * * * *